March 28, 1939. B. N. LOBDELL 2,152,553
SADDLE FOR CYCLES
Filed March 23, 1936 2 Sheets-Sheet 1
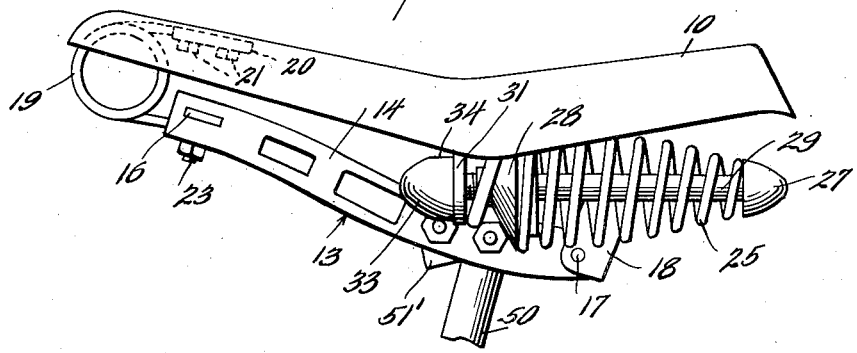
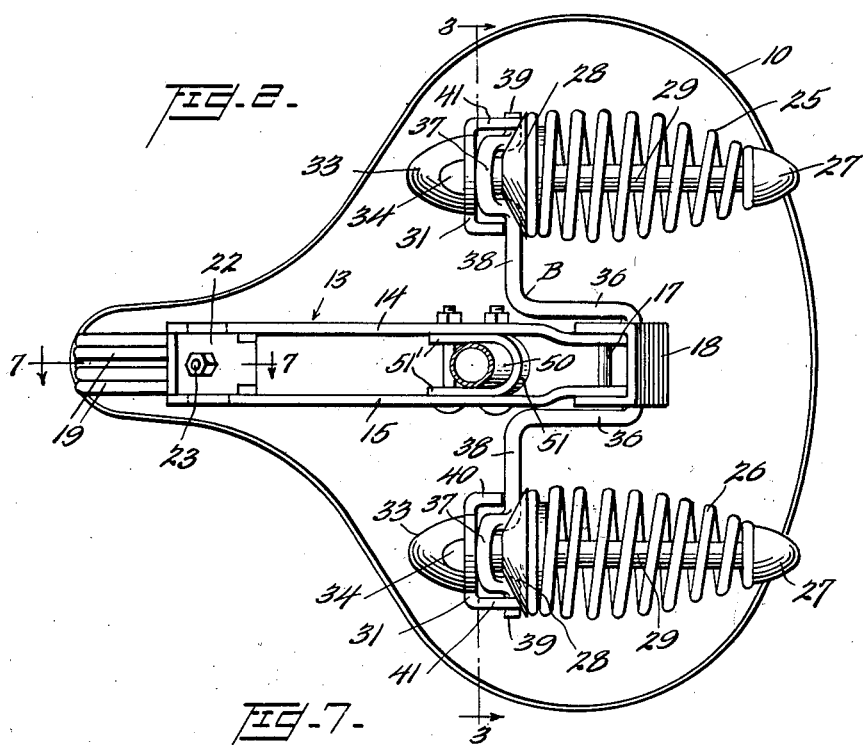
Inventor
B. N. Lobdell,

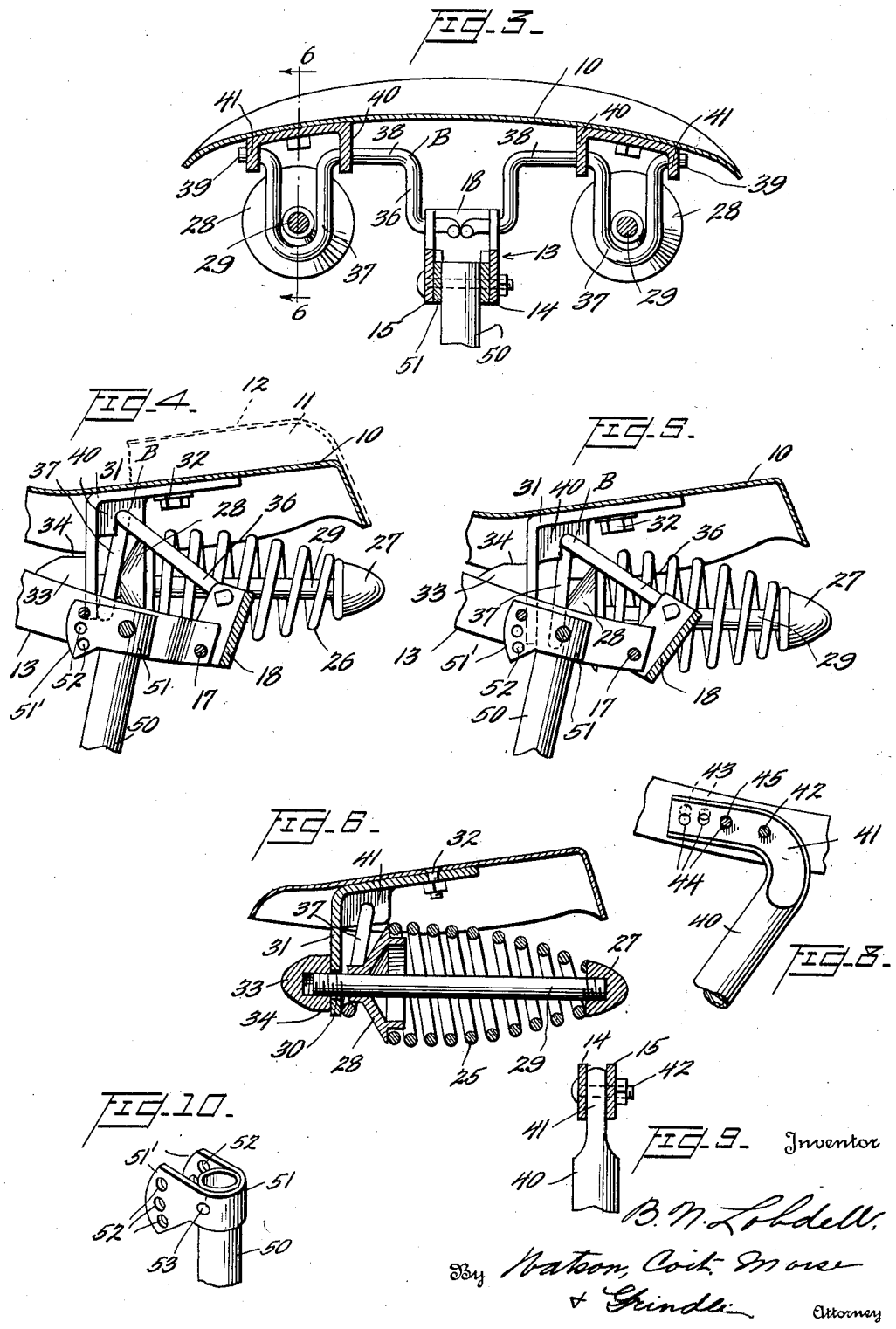

Patented Mar. 28, 1939

2,152,553

UNITED STATES PATENT OFFICE 2,152,553

SADDLE FOR CYCLES

Benjamin N. Lobdell, Alma, Mich., assignor to The Lobdell-Emery Manufacturing Company, Alma, Mich., a corporation of Michigan Application March 23, 1936, Serial No. 70,491

13 Claims. (Cl. 155—5.20)

This invention relates to saddles for cycles such as bicycles, motorcycles, velocipedes, etc. and has for its object the provision of a novel and improved type of saddle having advantages over the many types heretofore designed, suggested or actually used.

One purpose of the invention is to provide a cushioning means for saddles which, while being thoroughly effective in damping the vibrations of the seating member, is nevertheless more compact and less expensive to construct than the spring cushioning means of the prior art. In accordance with my invention the elongated downwardly depending springs now most commonly employed in connection with saddle supports are dispensed with and in lieu thereof compression springs substituted which are so disposed with respect to the seating member that their axes lie generally parallel to that member instead of being arranged angularly or normally relatively thereto. A novel mechanism for transmitting the weight of the rider to the springs is also provided so that the downward motion of the seating member is thoroughly and effectively resisted yieldingly by the springs, the weight of the rider being spring supported at all times and the springs having ample capacity, in adition, to effectively absorb additional shocks incident to the passage of the vehicle over obstructions or over inequalities in the roadway along which the vehicle having the novel saddle is progressing.

The resilient means interposed between the saddle posts or vehicle body and the seating member is so designed as to include only parts which may be readily and cheaply manufactured and these several parts are so assembled that replacement of any broken part may be easily effected. This is particularly true of the springs, which may be replaced at slight expense and minimum loss of time whenever breakage occurs. The spring supporting means is of adjustable nature so that the normal compressive resistance of the springs may be regulated to suit the individual needs of the riders. A novel form of saddle post is also provided, which post is designed and intended to comprise a permanent portion of the saddle and which is so constructed as to enable the user thereof to angularly adjust the saddle to the position found to be most comfortable.

In the accompanying drawings, one embodiment of the invention is set forth by way of example but it will be appreciated by one skilled in the art that many of the desirable features of the invention may be incorporated in saddles which differ substantially in appearance and minor features of construction from that which is illustrated.

In the drawings:
Figure 1 is a full side elevation of the saddle;
Figure 2 is a bottom plan view of the same;
Figure 3 is a section on line 3—3 of Figure 2;
Figure 4 is a partial longitudinal section through the saddle, taken on the central axis thereof;
Figure 5 is a similar view but showing the parts in different positions;
Figure 6 is a section on line 6—6 of Figure 3;
Figure 7 is a section on line 7—7 of Figure 2;
Figures 8 and 9 are detailed views showing one form of saddle post; and
Figure 10 is a perspective view of a modified form of saddle post.

The seating member of the saddle is indicated at 10 and this member may be of any ordinary or usual construction although I prefer to employ sheet metal in its fabrication, the member 10 shown being a one piece sheet metal member shaped by a pressing or stamping operation. It may be covered with a resilient layer of sponge rubber such as indicated at 11 which layer is in turn covered by a sheet or layer of natural or artificial leather or like material, indicated at 12, this uppermost layer being suitably secured to member 10.

The reach member is indicated at 13 and comprises essentially parallel elongated metallic plates 14 and 15 the forward ends of which are secured together by a cross member 16 and the rear ends of which are united by means of a bolt or rivet 17 which bolt or rivet likewise comprises the pivotal support for the link 18, U-shaped in cross-section, and the function of which will be hereinafter more completely set forth. At its forward end the reach member is connected to the forward end of the seating member 10 by means of a coiled torsion spring 19 so that the reach and seating members may move bodily toward or away from each other, such relative movements, however, being relative swinging movements about a pivotal axis adjacent the forward end of the saddle and movements of these members toward each other being opposed by the spring mechanism hereinafter to be described.

One end of the torsion spring 19 is secured by means of a clamping plate 20 and bolts or rivets 21 to the seating member and the other end is secured between the cross brace 16 of the reach member, previously referred to, and a clamping plate 22 secured to the cross member 16 by means of a bolt 23. Preferably the bolts 23 and 21 are provided with nuts so that, by unloosening these nuts, spring 19 may be released when broken and a new spring inserted.

Compression springs are indicated at 25 and 26 respectively, these springs being supported from the seating member and being disposed with their axes parallel to each other and also in substantial or general parallelism with the seating member itself so that the springs, reach member and seating member form a compact unit. It is the function of these springs to carry the weight of a rider mounted upon the seating member at all times to insure riding comfort and to this end they are so mounted, and so connected to the seating and reach members as to offer increased resistance to relative movements of these members toward each other as the angle between the members decreases. The springs are similar and are similarly connected to the reach and seating members so that it will be necessary to describe in detail only one such spring and its mounting and actuating mechanism.

Spring 26 is illustrated in section in Figure 6 and it will be perceived that this spring, which is generally helical, has a relatively small end which rests or seats against a generally conical fixed abutment member 27 and a large end which rests against a conical abutment member 28, which last mentioned abutment is movable with respect to the fixed abutment 27. Abutment 27 is fixed upon the end of a rod 29 extending axially of the spring which rod slidably supports the movable abutment 28 and extends through an aperture 30 in the downwardly projecting portion of a bracket 31 firmly secured to the seating member by bolts or rivets 32. A conical nut 33, threaded upon the end of rod 29 remote from nut 27, secures this end of the rod to the bracket 31 and this nut is provided with flat faces 34 for engagement by a suitable wrench so that it may be readily removed from rod 29 and spring 25 released. Likewise by rotating nut 33 through various angular distances on rod 29 the degree of initial compression of spring 25 may be adjusted as desired thus enabling each individual rider to adjust the springs to his satisfaction.

The free end of the reach member 13 has attached thereto, as previously explained, a link 18 which link may rock about the axis of the pivot 17. To the upper end of this link is connected the extreme outer end of one arm 36 of a crank member generally indicated at B. Crank B has a second arm indicated at 37, disposed angularly to arm 36 and generally U-shaped as shown in Figure 3, arms 36 and 37 of crank B being integral with the aligned axial or shaft portions 38 and 39 of this crank. Portions 38 and 39 of the crank are received in aligned apertures formed in lugs or ears 40 and 41 which preferably comprise integral portions of bracket 31 so that the crank may rotate about the common axis of crank portions 38 and 39. The legs of the U-shaped portion 37 of the crank are disposed upon opposite sides of rod 29 and bear against the conical outer face of the movable spring abutment 28. Hence it is clear that when the distance between the reach member and the seating member is decreased, the crank will be rocked and spring 25 compressed. This action may be more fully understood from a consideration of sections 4 and 5, the various parts being shown in Figure 4 with spring 26 fully extended and in Figure 5 with the spring partially compressed. Downward movement of the seating member toward the reach member results in upward thrust of the link 18 upon the arm 36 of the crank thus causing rotation of the crank in a counterclockwise direction (Figure 5) and hence causing the arm 37 of the crank to press against movable abutment 28 of the spring and to cause this abutment to slide along rod 29 to a greater or lesser extent. The movement of the reach member in Figure 5 is only slight and it will be appreciated that upon further movement of the seating members toward each other further rotation of the crank about its axis, and further compression of spring 25 will occur. When the seating member is not loaded the spring will expand to its full extent which movement of expansion is limited by reason of the fact that arm 37 of the crank B will contact with bracket 31, as shown in Figure 6.

I prefer to employ two springs, as shown in the drawings, as in this case the springs may be made relatively light, but the invention contemplates the use of one spring or more than two springs, it being only necessary to vary the details of the crank and link mechanism by means of which relative movement of the reach and seating members is communicated to the springs. I also prefer to employ springs of the type illustrated in which one end is smaller than the other in order that the spring resistance to downward motion of the seating member will gradually increase as the motion continues.

In Figures 8 and 9 are illustrated the saddle supporting post 40 which may comprise a solid or tubular column having a flattened portion 41 at its upper end and turned and disposed angularly with respect to the main portion of the column, that is, the portion which is adapted to be inserted in a suitable socket in the cycle. Flattened portion 41 of the of the post lies between the parallel inner walls of members 14 and 15 of the reach member and these members and the post are provided with aligned apertures through which a pivot member 42 is passed. Members 14 and 15 are also provided with pairs of aligned apertures 43 and the flattened portion 41 of the post with a series of apertures 44, the relationship between apertures 43 and 44 being such that, when the angularity of the post is changed by rocking the same about pivot 42, any selected aperture 44 may be brought into register with the cooperating aligned apertures 43, after which a securing bolt such as 45 may be passed through the aligned apertures and the post secured in the desired position. By this means the relative angularity of the saddle and the saddle post may be adjusted. The thickness of the upper end 41 of the saddle post is immaterial to the invention and it is obvious that when the parallel portions 14 and 15 of the reach member are spaced as widely apart as shown in Figure 3 the flattened upper end of the post will need to be enlarged rather than contracted. The distance betwen the members 14 and 15 is, however, immaterial.

In Figure 10 the post 50 is shown to have secured to its upper end a sheet metal member 51 which partially encircles the post and has parallel projecting wings 51' provided with pairs of aligned apertures 52. An aperture for the reception of a pivot member is indicated at 53. This form of post is alternative to that shown in Figures 8 and 9. It is preferred that the member 51 be welded to member 50 but other securing means may be employed if desired.

Instead of utilizing a spring member such as 19 for the purpose of directly pivoting the forward end of the reach member to the seating member, others means may be employed, such as a direct pivotal connection, and obviously other changes in design and arrangement may be made without departing from the teachings of the invention.

Having thus described the invention, what is claimed as new and desired to be secured by Letters Patent is:

1. A saddle for cycles comprising a seating member, a reach member extending substantially longitudinally of said seating member, one end of said reach member being connected to said seating member in such manner that said seating member may swing bodily about said connection toward and away from said reach member, a coiled compression spring extending generally parallel to the reach member, a crank mounted on the seating member to rock about a fixed axis, and a link connecting one part of the crank to the free end of the reach member, another part of the crank being positioned to act on the end of said spring when the crank is rocked in one direction of rotation.

2. A saddle for cycles comprising a seating member, a coiled compression spring disposed with its axis generally parallel to the seating member, means mounted upon the seating member for supporting the spring, said means including a fixed abutment at one end of the spring, a movable abutment element at the other end of the spring, a reach member, and a crank having one arm connected to the reach member and another arm operatively engaging said element.

3. The combination set forth in claim 2 in which the crank is connected to the reach member by means of an interposed link.

4. A saddle for cycles comprising a reach member, a seating member extending generally parallel to the reach member and movable bodily toward the same, compression springs mounted upon the seating member one on each side of the reach member, and mechanism operatively connecting the reach member and springs whereby the springs are simultaneously compressed when the said member are caused to approach each other.

5. The combination set forth in claim 4 in which the springs comprise helical coils, the axes of which are parallel.

6. The combination set forth in claim 4 in which each spring encircles an axially disposed rod one end of which is secured to a bracket fastened to the seating member.

7. In a cycle for saddles, in combination, a seating member, a reach member, a bracket secured to the seating member and projecting downwardly therefrom, said bracket having an aperture formed therein, a rod projecting through said aperture, a stationary abutment on the end of the rod remote from the bracket, a slidable abutment on the rod adjacent the bracket, a helical spring having its ends bearing against said abutments, and means for operatively connecting the slidable abutment to the reach member whereby movement of the reach member toward the seating member is yieldingly opposed by said spring.

8. The combination set forth in claim 7 in which said means includes a crank, one arm of which is interposed between said bracket and said sliding abutment.

9. A saddle for cycles comprising a substantially rigid seating member or base, a reach member extending longitudinally of said seating member, one end of said reach member being connected to the corresponding end of the seating member in such manner that said seating member may swing bodily about said connection toward or away from said reach member, a spring carried by and extending longitudinally of the seating member, and means carried by said seating member pivotally connected with the free end of the reach member and operatively engaging the spring, whereby said spring is caused to yieldingly oppose relative swinging movement of the reach member and the seating member toward each other.

10. A saddle for cycles comprising a substantially rigid seating member or base, a reach member extending longitudinally of said seating member, one end of said reach member being connected to the corresponding end of said seating member in such manner that said seating member may swing bodily about said connection toward and away from said reach member, a spring carried by one of said members at a point remote from said connection and extending substantially longitudinally of said members, and means carried by and fulcrumed upon the same one of said members by which said spring is carried, said means also being operatively connected with said spring and pivotally connected with the free end of said other member, whereby said spring is caused to yieldingly oppose relative swinging movement of the reach member and the seating member toward each other.

11. In a saddle for cycles comprising a substantially rigid seating member or base, a reach member extending longitudinally of said seating member, one end of said reach member being connected to one end of said seating member in such manner that said seating member may swing bodily about said connection toward and away from said reach member, the combination of means for yieldingly resisting relative movement of said members toward each other, said means including a two-armed lever pivotally mounted on the seating member, a link connecting one arm of said lever to the free end of the reach member and adapted to move said lever when said seating and reach members are moved relatively to each other, and resilient means connected with one of said members and operatively associated with said lever for opposing movement of said lever under the thrust of said link.

12. A saddle for cycles comprising a substantially rigid seating member or base, a reach member extending longitudinally of said seating member, the forward end of said reach member being connected to the forward end of said seating member in such manner that said seating member may swing bodily about said connection toward and away from said reach member, a coiled compression spring normally extending generally parallel with said reach member, and a two-armed bell-crank member fulcrumed at its intermediate angle portion upon said seating member, the end of one arm of said bell crank member being connected to said reach member and the other arm operatively connected with said spring, whereby said spring is caused to yieldingly oppose relative pivotal movement of the reach member and the seating member toward each other.

13. A saddle for cycles comprising a substantially rigid seating member or base, a reach member extending longitudinally of said seating member, one end of said reach member being connected to one end of said seating member in such manner that said seating member may swing bodily about said connection toward and away from said reach member, a coiled compression spring normally extending generally parallel with and longitudinally of said reach member, a crank shaft having a horizontal portion rotatably mounted on said seating member and a pair of spaced crank arms on said shaft, one of said arms being connected to the reach member and the other arm positioned to axially compress the spring when the crank shaft is rocked about its axis in one direction, said crank shaft including its crank arms being disposed substantially within the space between the planes of said seating and reach members.

BENJAMIN N. LOBDELL.